May 1, 1951  E. C. GRIBBLE  2,551,263
TRANSIT SHED
Filed Dec. 26, 1950  4 Sheets-Sheet 3
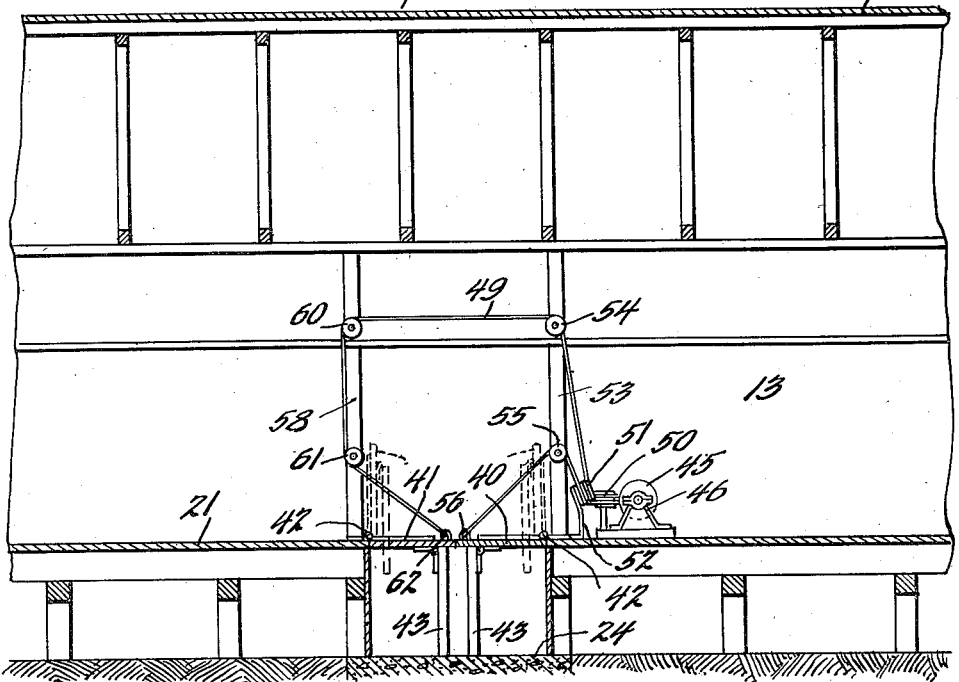
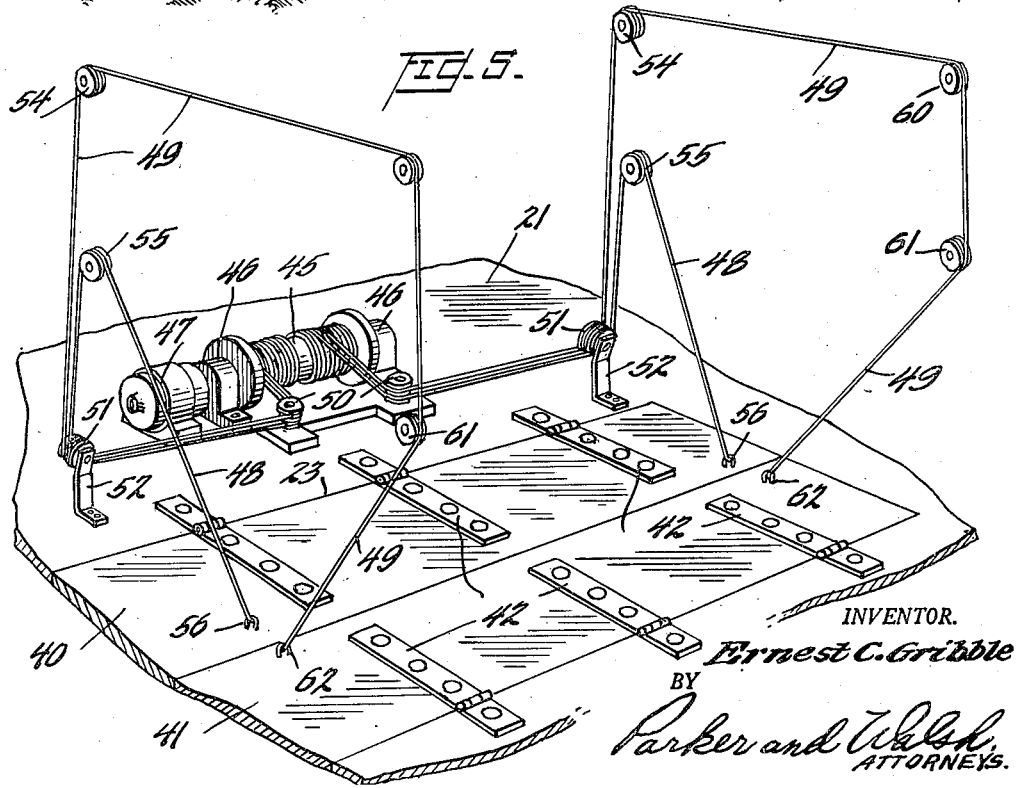
INVENTOR.
Ernest C. Gribble
BY
Parker and Walsh
ATTORNEYS.

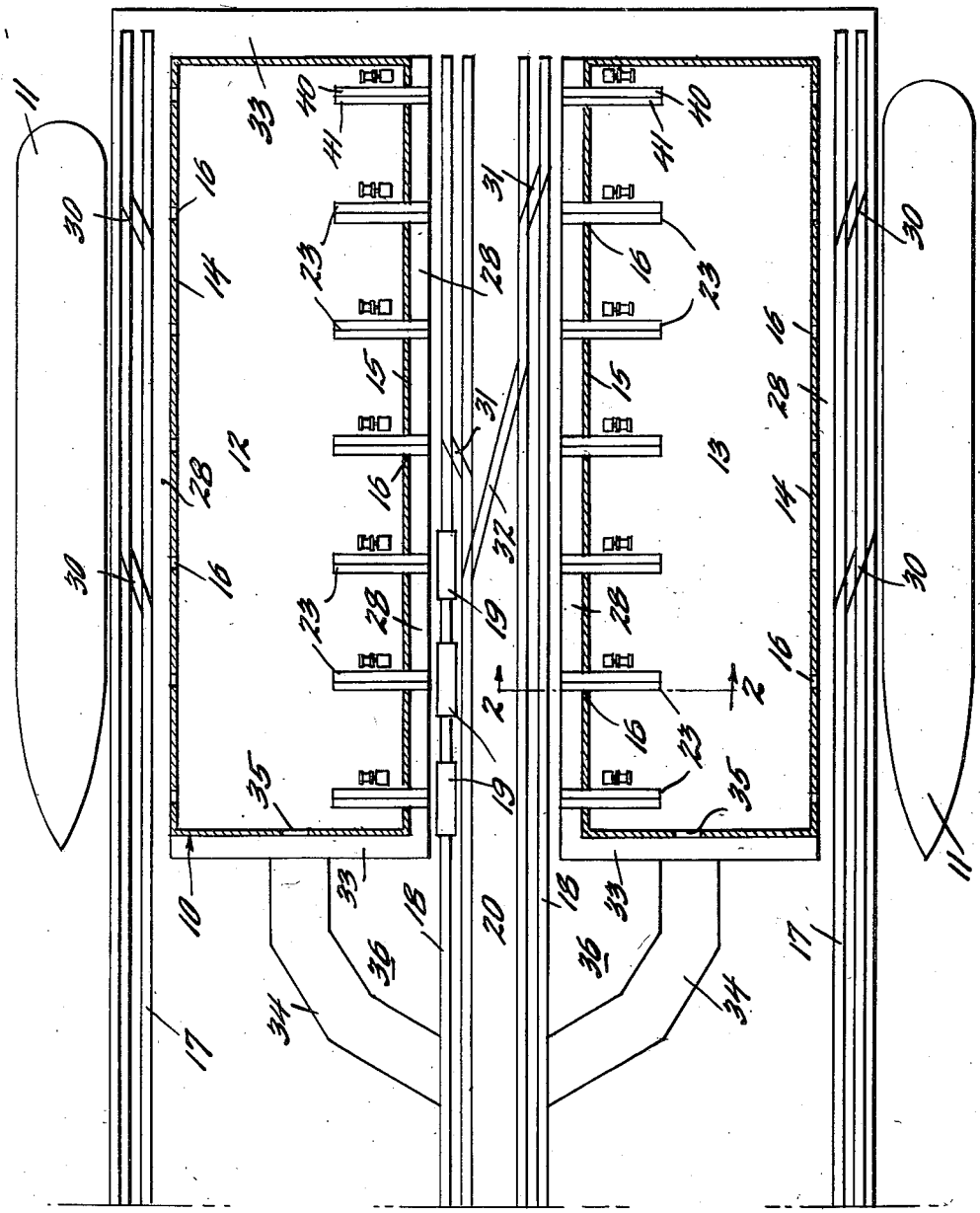

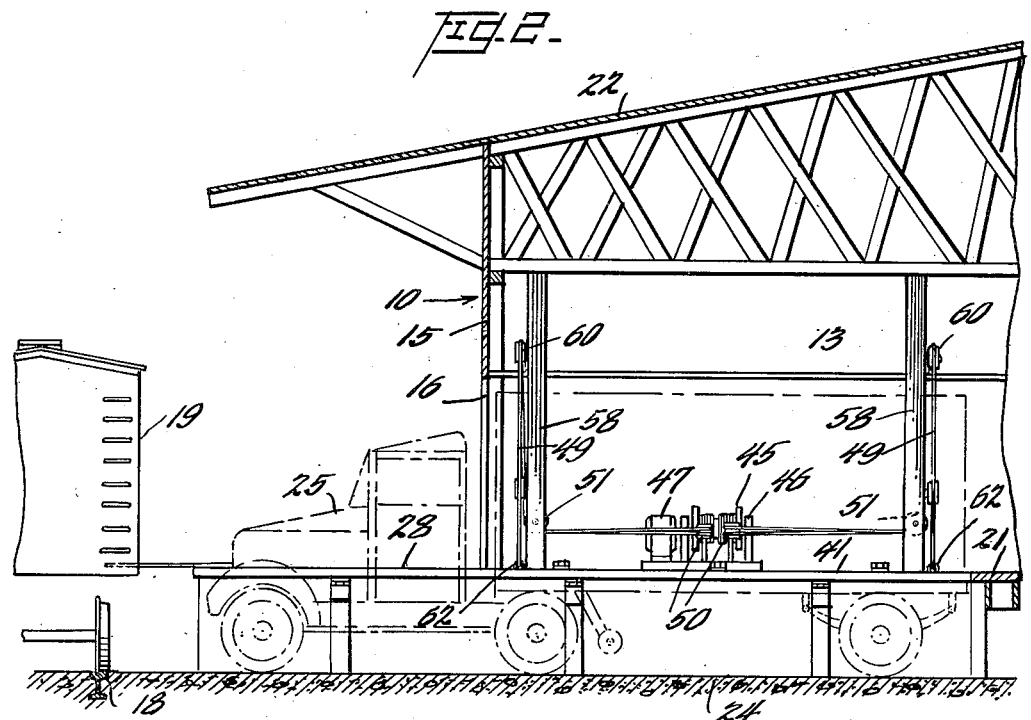
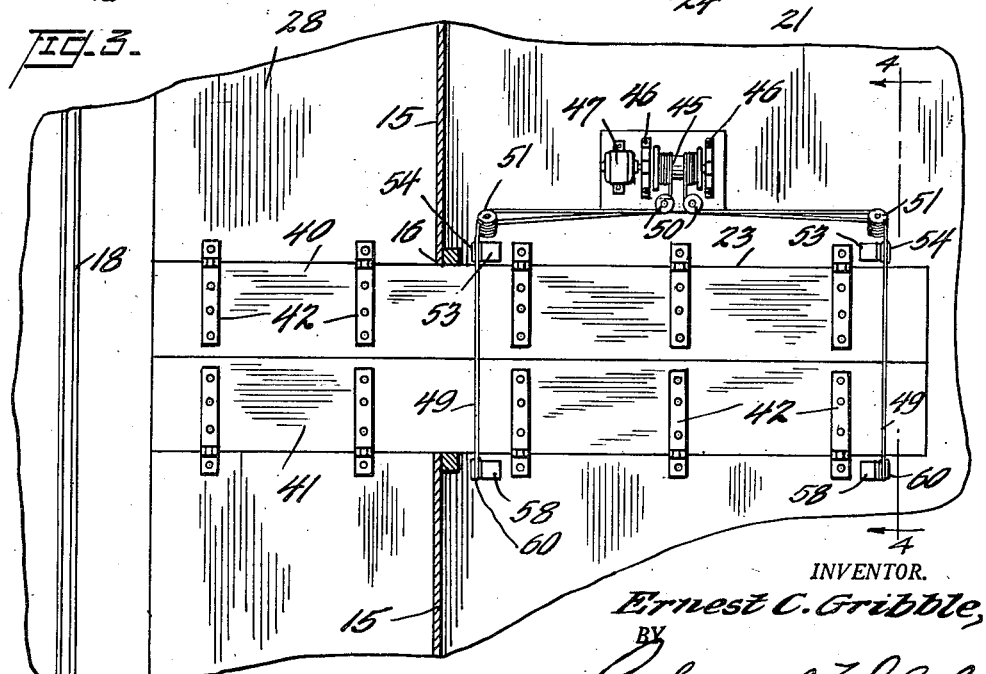

May 1, 1951  E. C. GRIBBLE  2,551,263
TRANSIT SHED
Filed Dec. 26, 1950  4 Sheets-Sheet 4
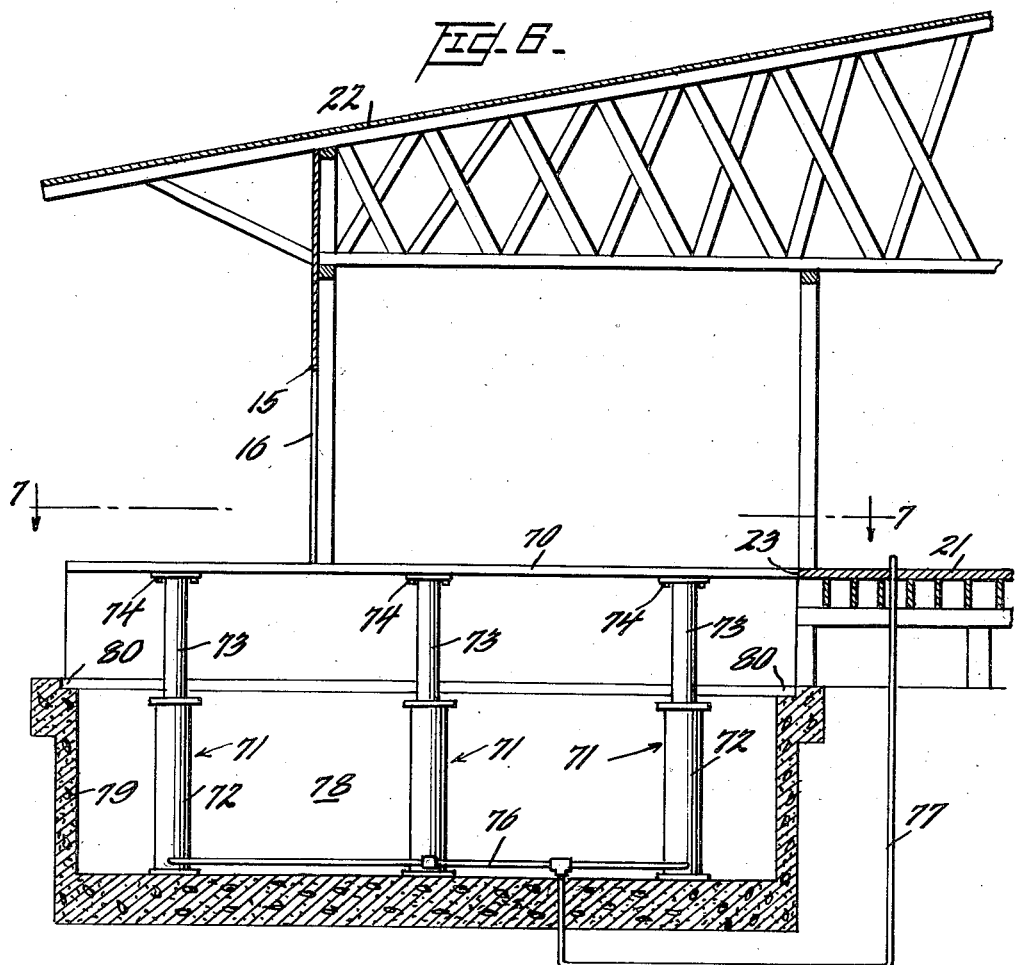
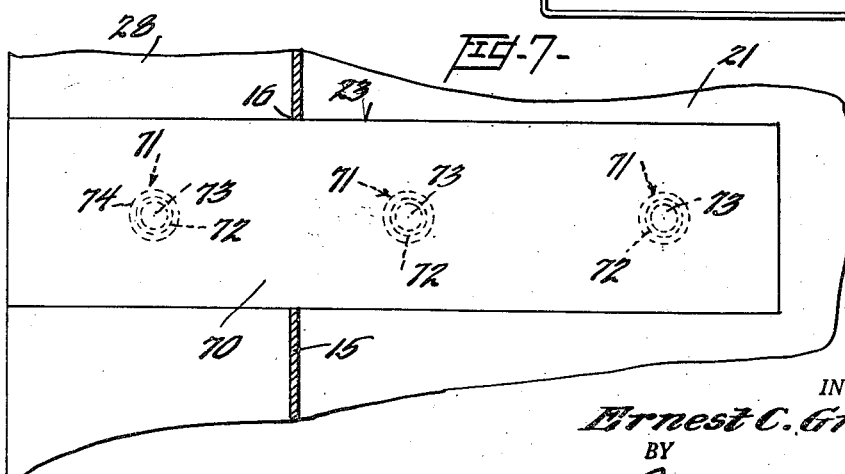
INVENTOR.
Ernest C. Gribble
BY
Parker and Walsh
ATTORNEYS.

Patented May 1, 1951

2,551,263

UNITED STATES PATENT OFFICE 2,551,263

TRANSIT SHED

Ernest C. Gribble, Olympia, Wash.

Application December 26, 1950, Serial No. 202,660

12 Claims. (Cl. 104—29)

This invention relates to a transit shed, and is an improvement over my prior patent, No. 2,086,799, granted July 13, 1937.

Since the advent of motor freight vehicles, the handling of freight in terminals, transit sheds and the like has presented serious problems. For many years, it has been the common practice to extend railroad sidings along the sides of terminals and transit sheds in close proximity to the floors thereof, and the sidings were depressed to the proper extent with respect to the transit shed so that the floors of freight cars would be at the same level as the floors of the sheds. With such arrangement, and with the sidings disposed in close proximity to the shed floors, freight can be trucked directly into and out of a freight car.

With the advent of motor freight vehicles, it became the common practice to pave the surface across the railroad tracks so that motor trucks and tractor-trailer combinations could back directly up to the edges of transit shed floors. The beds of such freight-carrying motor vehicles are approximately at the level of the floors of freight cars, thus permitting the trucking of packages and the like directly from the floor of a transit shed into a motor truck or trailer.

While the arrangements of transit sheds, railroad sidings and paved surfaces referred to are such as to facilitate both the loadings of freight cars and trucks, a serious problem is involved. It will be apparent that a single truck backed across a railroad siding blocks the siding so that freight cars cannot be moved in and out, and this results in substantial delays in the handling of freight, and creates a situation that is dangerous to property and personnel. In my prior patent referred to, the problem is solved to the extent that the formation of indentation at points along the transit shed walls and the extension of the paving into such indentations permits the backing of trucks to recessed edges of the transit shed floors wholly inwardly of the railroad sidings, and accordingly when a truck or a plurality of trucks is being loaded, freight cars can be moved along the sidings without interference. The structure of my prior patent accordingly greatly facilitates the handling of freight at terminals and transit sheds, but it possesses a disadvantage in that the loading platform along the side of a transit shed is cut away for each truck indentation, and at such points freight cars cannot be loaded.

An important object of the present invention is to improve on the structure of my prior patent by providing an arrangement whereby loading platform space is not sacrificed when no trucks are being loaded, thus permitting any portion of the loading platform to be utilized for trucking freight into freight cars, thus not only permitting any portion of a length of a platform to be used for this purpose, but also permitting the freight cars to be more advantageously disposed with respect to the location in the transit shed of the freight to be loaded on particular cars.

A further object is to provide a transit shed structure of the character referred to wherein the shed floor is provided with one or more motor truck indents as in my prior patent referred to, and wherein movable means is employed and provided with actuating means to move it into a position forming a continuation of the transit shed floor, when no trucks are in the indentations, whereby such movable means provides a surface over which freight may be trucked into freight cars.

A further object is to provide in a transit shed of the character referred to a movable floor section or sections adapted to be vertically moved into a position to form continuations of the shed floor and loading platform in one or more of the truck indentations referred to, and wherein the movable floor substantially fits the indentation and has its outer edge coincident with and forming continuations of the loading platform to facilitate the movement of freight thereover into freight cars.

Other objects and advantages of the present invention will become apparent during the course of the following description.

In the drawings, I have shown several embodiments of the invention. In this showing, Figure 1 is a plan view of a transit shed, shown in the present instance as a steamship dock shed, the walls of the shed being shown in section, Figure 2 is a vertical section on line 2—2 of Figure 1.

Figure 3 is an enlarged fragmentary horizontal sectional view through a portion of the transit shed, showing one of the truck indentations, Figure 4 is a vertical sectional view taken substantially on line 4—4 of Figure 3, Figure 5 is a perspective view of one form of movable floor sections and their associated operating means, Figure 6 is a vertical sectional view similar to Figure 2, showing a modified form of the invention, and Figure 7 is a horizontal sectional view on line 7—7 of Figure 6.

Referring to Figure 1, there is illustrated a transit shed indicated as a whole by the numeral 10, shown in this instance in connection with a steamship dock at which ships 11 may be tied up. The left hand end of the dock obviously is the land end and freight is transported to and from the dock from such end thereof.

It will become apparent that the present invention is not limited to any particular type of transit shed, that is, as to dimensions, whether the shed is formed of a single section or a plurality of sections. In Figure 1, the shed is shown as being formed of two longitudinal sections 12 and 13, each of which is provided with an outer wall 14 and an inner wall 15, and these walls are provided with door openings 16. Outwardly of the walls 14 are arranged railroad tracks 17, and similar tracks 18 extend between the sections 12 and 13 of the shed. Railroad freight cars 19 are movable over the tracks as suggested, for example, in Figure 2.

Two pairs of tracks 18 are shown in Figure 1 and they are separated from each other to provide space for the passage of motor drays, trucks or the like, and such space, indicated by the numeral 20, is suitably paved.

Each transit shed is provided with a floor 21, elevated above the surrounding surface as shown in Figures 2 and 4, the level of the floor being approximately coincident with the levels of the floors of freight cars and motor truck bodies. Each shed section is roofed as at 22 completely to cover the shed.

Each shed section 12 and 13 is provided with a plurality of indents 23 extending through the inner wall 15 thereof. These indents, of course, are sheltered by the roof 22 of each shed section, and the paving 20 extends into each of the indents as indicated by the numeral 24 (Figure 2). A dray or truck indicated as a whole by the numeral 25 has been shown in dotted lines in position in the indent 23 in Figure 2, and, of course, a truck may be backed into any or all of the indents. It also will be apparent that the indents will be made of such width and depth as to accommodate any type of motor truck, tractor-trailer combination, or the like.

Each transit shed section has the floor thereof extended beyond the wall 15 to form a platform 28 preferably extending from end to end of the shed section except where broken by the indent 23 as shown in Figure 3. Each platform has its edge extending along and parallel to the adjacent tracks 18 and accordingly the platforms are close to and approximately at the level of the floors of the freight cars to facilitate the trucking of freight between each transit shed and an adjacent freight car or cars. The platforms 28 are accessible to the interiors of the shed sections through the doors 16 in the walls 15 thereof.

Freight cars may be shifted between the tracks of the several pairs to facilitate the placing of any car or cars in loading or unloading position relative to the transit sheds. For this purpose the tracks 17 are provided with switches 30, while similar switches 31 are provided between the tracks of each pair 18, and the inner tracks of the pairs 18 are preferably connected by a switch 32. Accordingly, freight cars may be shifted back and forth between the tracks of the pairs 17, or between the pairs of the tracks 18, and preferably only one switch track 32 extends across the roadway 20.

Platforms 33 are formed at the ends of the shed sections, and the platforms at the land end of the dock are accessible to trucks by means of ramps 34, preferably in alignment with end shed doors 35. The spaces 36 between the ramps 34 and rails 18 are preferably paved to facilitate the backing of trucks against the platforms 33.

The structure thus far described corresponds generally to what is disclosed in my prior patent, No. 2,086,799, referred to above, and facilitates the handling of freight as discussed in such patent. Obviously, with the indents 23 completely open as in my prior patent referred to, motor truck vehicles can be backed into any of the indents and will clear the tracks 18 so as not to interfere with the movement of freight cars over the tracks 18. However, regardless of the fact that such an arrangement is highly advantageous over prior structures, it will be apparent that each indent leaves a break in the platform 28, thus eliminating an otherwise usable portion of the platform for the trucking of freight into and out of freight cars. The present invention overcomes this difficulty by providing means whereby each entire platform, or any length thereof having indents in which trucks are not arranged, may be used for loading and unloading freight cars.

Referring to Figures 2 to 5 inclusive, the numerals 40 and 41 designate complementary doors adapted to close each indent 23 and to form continuations of the floor 21 and platform 28. These doors may be formed as steel plates, and they are hinged to the adjacent floor and platform portions as at 42. When closed, the doors 40 and 41 are flush with the floor 21 as shown in Figure 4, and they are positively supported by depending hinged legs 43 having their lower ends engaging the paving 24. The legs 43 being freely hinged to the doors remain in vertical position and swing outwardly when the doors are raised to the dotted line positions shown in Figure 4.

Power mechanism is preferably employed for raising and lowering the doors 40 and 41. Referring particularly to Figure 5, the numeral 45 designates a winding drum supported for rotation at its ends by bearings 46. A motor 47 at one end of the drum drives it to effect the winding and unwinding of a pair of cables 48 for the door 40 and a second pair of cables 49 for the door 41. One cable of each pair passes from the drum 45 around a pulley 50 having its axis vertical, and from this pulley the cables extend around pulleys 51 supported for rotation on horizontal axes by brackets 52. Adjacent the pulleys 51 are arranged posts 53 at the upper ends of which are supported pulleys 54 rotatable on horizontal axes. From each pulley 51, the associated cable 48 passes around a pulley 55 carried by the associated post and thence to one end of the door 40 adjacent one end thereof, each cable 48 being connected to such door as at 56.

The posts 53 are arranged just beyond the hinged edges of each door 40, and at corresponding positions with respect to the door 41 is arranged a second pair of similar posts 58 (Figure 3). Each cable 49 extends from its associated pulley 54 around a similar but single pulley 60 carried by the associated post 58, and such post carries another lower single pulley 61 downwardly and around which the cable 49 passes. Each cable 49 is connected as at 62 to one end of the door 41 adjacent the free edge thereof as shown in Figure 5. As further explained below, the winding of the cables on the drum 45 raises the doors 40 and 41 to vertical open positions, while the unwinding of the cables lowers the doors to closed positions. In Figures 6 and 7 of the drawings, a modified form of means for opening and closing each indent is illustrated. In the previously described form of the invention, movable means in the form of doors is shown for this purpose, and the doors are adapted to be swung upwardly to open position. In the form of the invention shown in Figures 6 and 7, the means for opening and closing each indent is shown in the form of a unitary platform 70, corresponding in shape to and adapted to fit in the space cut in the floor 21 and platform 28 to form each indent. This platform is movable downwardly to open position when each indent is to be opened, in the manner described.

The platform 70 is preferably raised and lowered by means of hydraulic rams, two of which are shown in Figure 6, each designated as a whole by the numeral 71. Each ram comprises a hydraulic cylinder 72 having a vertically movable piston 73 therein fixed at its upper ends as at 74 to the platform 70. Any suitable means may be employed for supplying oil or other hydraulic liquid under pressure to the cylinders 72. In Figure 6, the cylinders are shown as being connected by a manifold pipe 76 to which is connected a pipe 77 leading from the pressure source, (not shown) and adapted to be controlled in any desired or conventional manner by suitable valve means. The cylinders 72 preferably are supported in the bottom of a concrete well 78, the side and end walls 79 of which are recessed at their upper edges as at 80 to receive the edges of the platform 70 when the latter is lowered. In this case, the paving 24 (Figure 2) obviously is omitted and the platform 70 forms the surface over which trucks are backed into each indent.

*Operation*

The method of using the transit shed will be apparent from the foregoing description. In the case of dock sheds, freight will be unloaded from ships in the usual manner and deposited in the sheds until ready to be loaded on freight cars or motor drays. Freight cars may be brought into loading position on the tracks 17 and 18, the level of the floor of a freight car being approximately at the level of the transit shed floor. Freight may be trucked between the sheds and the motor drays when the latter are backed into indents 23 of either of the sheds 12 or 13. These indents are arranged at spaced points so that a truck may be backed into an indent relatively close to the freight to be loaded, thus eliminating the trucking of the freight through considerable distances.

A dray in one of the indents will occupy the dotted line position shown in Figure 2, and with the rear end of the truck or trailer body adjacent the inner limit of an indent and with the trailer body bed at the level of the floor 21, freight readily may be loaded or unloaded by hand or power trucks. Any motor truck conveyance so arranged in an indent will be completely free from the tracks 18, thus permitting the free movement of freight cars over the tracks 18. The tracks are arranged at the level of the roadway, thus permitting free passage of trucks thereover. The loading and unloading will take place under the cover of the roof 22, and the latter preferably extends also over the platform 28.

Whenever an indent is not being used, assuming the form of the invention in Figures 1 to 5 inclusive is being employed, the doors 40 and 41 of such indent will be closed, as shown in solid lines in Figure 4. These doors extend through the platform 28 and, when closed, form continuations thereof, thus permitting freight to be handled on the portions of the doors between adjacent platform sections, when desired. Freight also may be trucked over the doors directly from one platform section 28 to another, thus facilitating the handling of the freight. The connecting means 56 and 62 (Figure 5) for the cables 48 and 49 are preferably detachable to be swung backwardly away from the doors adjacent the posts 53 and 58, whereupon freight may be trucked directly over the doors 40 and 41 and through the adjacent door opening 16.

When the doors 40 and 41 are to be opened, the cables 48 and 49 are connected to the doors as in Figure 5, whereupon the motor 47 is started to wind the cables on the drum 45, and the pulling of the cables raises the doors to the vertical dotted line positions shown in Figure 4. The arrangement shown permits the use of a single winding drum 45, but this makes necessary the extension of the cable across the doors, as between the pulleys 54 and 60. The substantial elevation of these pulleys provides ample vertical space beneath the portions of the cables 49 therebetween. The passing of the cables around the pulleys 55 and 61 is for the purpose of making the pull on the cables, when the doors 40 and 41 are open, substantially horizontal with negligible vertical components of force, thus effectively maintaining the doors 40 and 41 in open position. These doors are closed, of course, by reversing the motor 47 or by providing suitable clutch means (not shown) for disconnecting the motor from the drum 45 so that the doors 40 and 41 will be free to close by gravity. When these doors are closed, they will be positively supported by the legs or posts 43 (Figure 4), of which any suitable number may be employed.

The operation of the form of the invention shown in Figures 6 and 7 will be obvious. When the platform 70 is in its upper position shown in Figure 6, it is flush with the floor 21 and platform 28 and forms a continuation thereof, wholly free from any floor obstructions as in the form of the invention just described. The installation of the form shown in Figures 6 and 7 is somewhat more expensive. The platform 70 is raised by admitting hydraulic fluid under pressure through pipes 77 and 76 until the platform 70 reaches its upper operative position, and if desired, any suitable means may be employed for limiting upward movement of the platform 70. When the platform 70 is to be lowered to permit a truck to back into the indent, the valve mechanism (not shown) associated with the pipe 77 is operated to relieve hydraulic pressure in the bottoms of the cylinders 72, whereupon the platform 70 will move downwardly by gravity to its lowermost position, the edges of the platform 70 being supported by the shoulders 80 and by the upper ends of the cylinders 72.

It will be apparent that the present construction embodies all of the features of the structure shown in my prior patent, identified above, and that in addition thereto, it provides means for restoring continuity between any adjacent pair of platform sections 28 when a motor truck is not occupying the intervening indent 23. Under such conditions, freight cars may be loaded at additional points along the platform 28, and material-handling hand and power trucks more conveniently may be moved over the platform 28. This frequently saves substantial movement of such trucks around piles of freight stacked in the transit sheds.

While the invention has been particularly described with relation to its use with transit sheds, it will be obvious that the invention is not limited in its use to any particular type of shed or building. On the contrary, the invention is applicable for use with any types of buildings wherein rail and truck loading is practiced, and wherein there is a conflict or possible conflict between rail cars and trucks, for example at warehouses, factories, and commercial and industrial facilities of any nature. Where the expression "transit shed" is used in the claims, therefore, it is to be understood that this expression covers any type of building with which the invention is adapted to be employed.

I claim:

1. In combination, a transit shed having a floor, a railroad track parallel and in proximity to one side of said shed and arranged a substantial distance below the level of the floor thereof to facilitate the direct transferring of freight between said floor and the floor of a car on said track, said floor having an indent extending a substantial distance inwardly from said track, said indent being of a length to receive a vehicle wholly therewithin, and a closure structure for said indent movable from a normal position flush with said floor to form a continuation thereof and an inoperative position wholly opening said indent for an unimpeded reception of a vehicle.

2. In combination, a transit shed having a floor, a railroad track parallel and in proximity to one side of said shed and arranged a substantial distance below the level of the floor thereof to facilitate the direct transferring of freight between said floor and the floor of a car on said track, said floor having an indent extending a substantial distance inwardly from said track, the bottom of said indent having a surface substantially at the level of said railroad track, said indent being of a length to receive a vehicle wholly therewithin, and a closure structure for said indent movable from a normal position flush with said floor to form a continuation thereof and an inoperative position wholly opening said indent for an unimpeded reception of a vehicle.

3. In combination, a transit shed having a floor, a railroad track parallel and in proximity to one side of said shed and arranged a substantial distance below the level of the floor thereof to facilitate the direct transferring of freight between said floor and the floor of a car on said track, said floor having an indent extending a substantial distance inwardly from said track, said indent being of a length to receive a vehicle wholly therewithin, a closure structure for said indent movable from a normal position flush with said floor to form a continuation thereof and an inoperative position wholly opening said indent for an unimpeded reception of a vehicle, and means for moving said closure structure between said normal and inoperative positions.

4. In combination, a transit shed having a floor, a railroad track parallel and in proximity to one side of said shed and arranged a substantial distance below the level of the floor thereof to facilitate the direct transferring of freight between said floor and the floor of a car on said track, said floor having an indent extending a substantial distance inwardly from said track, the bottom of said indent having a surface substantially at the level of said railroad track, said indent being of a length to receive a vehicle wholly therewithin, a closure structure for said indent movable from a normal position flush with said floor to form a continuation thereof and an inoperative position wholly opening said indent for an unimpeded reception of a vehicle, and means for moving said closure structure between said normal and inoperative positions.

5. In combination, a transit shed having a floor and a wall at one side thereof and being provided outwardly of said wall with a platform at the level of said floor, a railroad track adjacent, parallel and in proximity to said platform and arranged a substantial distance therebelow to facilitate the direct transferring of freight between said platform and the floor of a car, said transit shed having an indent extending across the width of said platform and partially across said floor whereby said indent is of a depth sufficient to accommodate a vehicle wholly inwardly of said railroad track, said wall having an opening at least coextensive in width with said indent and of a height to accommodate a vehicle, and a closure structure normally occupying a position flush with said floor and platform and corresponding in area to the horizontal area of said indent to form continuations of said floor and said platform for the movement of freight between said floor and platform over said closure structure, said closure structure being movable to a second position to open said indent for the movement of a vehicle thereinto.

6. In combination, a transit shed having a floor and a wall at one side thereof and being provided outwardly of said wall with a platform at the level of said floor, a railroad track adjacent, parallel and in proximity to said platform and arranged a substantial distance therebelow to facilitate the direct transferring of freight between said platform and the floor of a car, said transit shed having an indent extending across the width of said platform and partially across said floor whereby said indent is of a depth sufficient to accommodate a vehicle wholly inwardly of said railroad track, said wall having an opening at least coextensive in width with said indent and of a height to accommodate a vehicle, a closure structure normally occupying a position flush with said floor and platform and corresponding in area to the horizontal area of said indent to form continuations of said floor and said platform for the movement of freight between said floor and platform over said closure structure, said closure structure being movable to a second position to open said indent for the movement of a vehicle thereinto, and means for moving said closure structure between said normal and second positions.

7. In combination, a transit shed having a floor and a wall at one side thereof and being provided outwardly of said wall with a platform at the level of said floor, a railroad track adjacent, parallel and in proximity to said platform and arranged a substantial distance therebelow to facilitate the direct transferring of freight between said platform and the floor of a car, said transit shed having an indent extending across the width of said platform and partially across said floor whereby said indent is of a depth sufficient to accommodate a vehicle wholly inwardly of said railroad track, said wall having an opening at least coextensive in width with said indent and of a height to accommodate a vehicle, said indent having a bottom surface substantially flush with the top of said railroad track and over which vehicles are adapted to roll into said indent, and a closure structure normally occupying a position flush with said floor and platform and corresponding in area to the horizontal area of said indent to form continuations of said floor and said platform for the movement of freight between said floor and platform over said closure structure, said closure structure being movable to a second position to open said indent for the movement of a vehicle thereinto.

8. In combination, a transit shed having a floor and a wall at one side thereof and being provided outwardly of said wall with a platform at the level of said floor, a railroad track adjacent, parallel and in proximity to said platform and arranged a substantial distance therebelow to facilitate the direct transferring of freight between said platform and the floor of a car, said transit shed having an indent extending across the width of said platform and partially across said floor whereby said indent is of a depth sufficient to accommodate a vehicle wholly inwardly of said railroad track, said wall having an opening at least coextensive in width with said indent and of a height to accommodate a vehicle, said indent having a bottom surface substantially flush with the top of said railroad track and over which vehicles are adapted to roll into said indent, a closure structure normally occupying a position flush with said floor and platform and corresponding in area to the horizontal area of said indent to form continuations of said floor and said platform for the movement of freight between said floor and platform over said closure structure, said closure structure being movable to a second position to open said indent for the movement of a vehicle thereinto, and means for effecting movement of said closure structure between said normal and second positions.

9. In combination, a transit shed having a floor, a railroad track adjacent one side of said shed parallel and in proximity to one edge of said floor and arranged a predetermined distance therebelow to facilitate the transferring of freight between said floor and the floor of a car on said track, said floor having an indent extending from said edge thereof a distance at least equal to the length of a vehicle, the bottom of said indent being paved approximately at the level of the top of said track to provide a surface over which a vehicle is adapted to be moved into said indent, and a door structure normally supported in a position forming a continuation of said floor for the movement of freight over said door structure, said door structure being mounted for movement upwardly wholly to free substantially the entire area of said indent to provide for the entrance of a vehicle thereinto.

10. In combination, a transit shed having a floor, a railroad track adjacent one side of said shed parallel and in proximity to one edge of said floor and arranged a predetermined distance therebelow to facilitate the transferring of freight between said floor and the floor of a car on said track, said floor having an indent extending from said edge thereof a distance at least equal to the length of a vehicle, the bottom of said indent being paved approximately at the level of the top of said track to provide a surface over which a vehicle is adapted to be moved into said indent, a door structure normally supported in a position forming a continuation of said floor for the movement of freight over said door structure, said door structure being mounted for movement upwardly wholly to free substantially the entire area of said indent to provide for the entrance of a vehicle thereinto, and means comprising cables connected to said door structure to move it upwardly.

11. In combination, a transit shed having a floor, a railroad track adjacent one side of said shed parallel and in proximity to one edge of said floor and arranged a predetermined distance therebelow to facilitate the transferring of freight between said floor and the floor of a car on said track, said floor having an indent extending from said edge thereof a distance at least equal to the length of a vehicle, and a vertically movable closure structure for said indent corresponding in area thereto and normally arranged flush with said floor to form a continuation thereof, said closure structure being mounted for movement downwardly to a second position in which it is substantially flush with the top of said track to form a supporting surface for a vehicle in said indent.

12. In combination, a transit shed having a floor, a railroad track adjacent one side of said shed parallel and in proximity to one edge of said floor and arranged a predetermined distance therebelow to facilitate the transferring of freight between said floor and the floor of a car on said track, said floor having an indent extending from said edge thereof a distance at least equal to the length of a vehicle, a vertically movable closure structure for said indent corresponding in area thereto and normally arranged flush with said floor to form a continuation thereof, said closure structure being mounted for movement downwardly to a second position in which it is substantially flush with the top of said track to form a supporting surface for a vehicle in said indent, and means for effecting movement of said closure structure from said normal position to said second position.

ERNEST C. GRIBBLE.

No references cited.